United States Patent
Antony Prince et al.

(10) Patent No.: US 10,421,036 B2
(45) Date of Patent: Sep. 24, 2019

(54) CONTINUOUS LIQUID DESICCANT DEHUMIDIFICATION SYSTEM

(71) Applicant: Ngee Ann Polytechnic, Singapore (SG)

(72) Inventors: James Selvaraj Antony Prince, Singapore (SG); Gurdev Singh, Singapore (SG); Kwok Ho Lam, Singapore (SG); Ayyanar Neelamegam, Singapore (SG); Belinda Owen, Singapore (SG)

(73) Assignee: NGEE ANN POLYTECHNIC, Singapore (SG)

( * ) Notice: Subject to any disclaimer, the term of this patent is extended or adjusted under 35 U.S.C. 154(b) by 141 days.

(21) Appl. No.: 15/310,240

(22) PCT Filed: Dec. 18, 2015

(86) PCT No.: PCT/SG2015/050497
§ 371 (c)(1),
(2) Date: Nov. 10, 2016

(87) PCT Pub. No.: WO2017/105342
PCT Pub. Date: Jun. 22, 2017

(65) Prior Publication Data
US 2018/0036675 A1 Feb. 8, 2018

(51) Int. Cl.
*B01D 53/14* (2006.01)
*B01D 47/00* (2006.01)
*B01D 53/26* (2006.01)
*B01D 61/36* (2006.01)
(Continued)

(52) U.S. Cl.
CPC ....... *B01D 53/1425* (2013.01); *B01D 53/263* (2013.01); *B01D 53/28* (2013.01); *B01D 61/364* (2013.01); *B01D 61/368* (2013.01); *B01D 65/02* (2013.01); *B01D 2252/10* (2013.01);
(Continued)

(58) Field of Classification Search
None
See application file for complete search history.

(56) References Cited

U.S. PATENT DOCUMENTS

| | | | |
|---|---|---|---|
| 3,563,860 A * | 2/1971 | Henderyckx | B01D 61/362 202/172 |
| 4,802,988 A | 2/1989 | Reale, Jr. et al. | |
| 5,350,519 A | 9/1994 | Kaschemekat et al. | |

(Continued)

FOREIGN PATENT DOCUMENTS

WO 2013074040 A1 5/2013

OTHER PUBLICATIONS

International Search Report for International Application No. PCT/SG2015/050497; Search completed Feb. 23, 2016, dated Feb. 23, 2016, 3 pgs.

(Continued)

*Primary Examiner* — Amber R Orlando
*Assistant Examiner* — Phillip Y Shao
(74) *Attorney, Agent, or Firm* — William P. Wilbar, IV

(57) ABSTRACT

This invention relates to a system for continuously dehumidifying humid gas. More particularly, this invention relates to a system that continuously dehumidifies gas using a liquid desiccant dehumidifying module, a regeneration modules utilizing a membrane distillation module to regenerate diluted liquid desiccant and means for connecting the two modules together.

14 Claims, 8 Drawing Sheets

(51) Int. Cl.
    *B01D 65/02*     (2006.01)
    *B01D 53/28*     (2006.01)

(52) U.S. Cl.
    CPC .... *B01D 2252/504* (2013.01); *B01D 2321/02* (2013.01); *B01D 2321/162* (2013.01)

(56) References Cited

U.S. PATENT DOCUMENTS

2010/0090356 A1   4/2010   Sines et al.
2010/0281893 A1   11/2010   Wheeler

OTHER PUBLICATIONS

Ratter et al., "Modeling of a flat plate membrane-distillation system for liquid desiccant regeneration in air-conditioning applications", International Journal of Heat and Mass Transfer, 2011, vol. 54, pp. 3650-3660.

\* cited by examiner

CONTINUOUS LIQUID DESICCANT DEHUMIDIFICATION SYSTEM

CROSS REFERENCE TO RELATED APPLICATIONS

This application is a national stage of PCT Patent Application No. PCT/SG2015/050497, entitled "Continuous Liquid Desiccant Dehumidification System" to Antony Prince et al., filed Dec. 18, 2015, the disclosures of which are incorporated herein by reference in their entirety.

FIELD OF THE INVENTION

This invention relates to a system for continuously dehumidifying humid gas. More particularly, this invention relates to a system that continuously dehumidifies gas using a liquid desiccant dehumidifying module, a regeneration module for regenerating diluted liquid desiccant and means for connecting the tow modules together. Still more particularly, the regeneration module is provided with a vacuum air gap membrane distillation module wherein the membrane distillation module is utilized to regenerate the diluted liquid desiccant.

PRIOR ART

Desiccant dehumidification processes involve the absorption of moisture from air or gas using desiccants. The desiccants reduce the amount of moisture in the air or gas by absorbing and storing the absorbed moisture. However, once the desiccant reaches a saturation point, the diluted desiccant will not be able to absorb any further moisture. In order for the diluted desiccant to continue absorbing moisture, the diluted desiccant would have to be regenerated. The regeneration of the diluted desiccant involves processes that reverse the moisture absorption process thereby removing the absorbed moisture from the desiccant.

Generally, there are two types of desiccants that are commonly used in the industry, solid desiccants and liquid desiccants. The downside of using solid desiccants is that the regeneration of saturated solid desiccants involve large amounts of thermal energy making the regeneration of solid desiccants a costly and energy inefficient process. Liquid desiccants are hygroscopic solutions that have a high affinity for water vapour. Liquid desiccants that are commonly used in dehumidification systems comprise very strong solutions of the ionic salts lithium chloride and calcium chloride. These ionic salts have the attractive characteristic that these slats are able to absorb large amounts of water vapour before becoming diluted. However, solutions of lithium chloride and calcium chloride are very corrosive. This corrosiveness requires that all wetter parts within the dehumidification system be appropriately shielded to prevent these parts from corroding.

The latent temperature of the liquid desiccant solution gradually increases as the liquid desiccant solution absorbs water vapour from humid air. The liquid desiccant's ability to absorb water vapours from humid air decreases as the liquid desiccant's temperature increases. In other words, this increase in the liquid desiccant's latent temperature in turn causes the liquid desiccant's ability to dry air to decrease dramatically. This means that when the diluted liquid desiccant is regenerated, the regeneration process will also have to lower the regenerated liquid desiccant's temperature so that the liquid desiccant's ability to dry air is recovered as well. One approach to limiting the impact of the heat released when the liquid desiccant absorbs water vapour is to flow liquid desiccant at a sufficiently high rate across the humid air so that its temperature rise is limited. The rapid flow liquid desiccant system described above is disadvantageous because a large volume of liquid desiccant must be circulated thereby requiring large pumps with relatively large power draws. Furthermore, droplets of the corrosive liquid desiccant solution may potentially be entrained within the pumps thereby limiting the lifespan of the pumps.

Existing methods of regenerating diluted liquid desiccants involve boiling the liquid desiccant at atmospheric pressure and by using various air-solution direct contact systems to remove the water vapour from the diluted liquid desiccant. In existing air-solution direct contact systems, in order to achieve the required flow rate across the membrane used in the regeneration chamber, large temperature differences are required between the distilland and the distillate. As such, in existing regeneration systems, the diluted liquid desiccant is first heated to temperatures above 130° C. or 150° C. The heated diluted liquid desiccant is then passed through the air-solution direct contact system, which removes the water vapours from the heated liquid thereby regenerating the liquid desiccant. However, this approach results in a regenerated liquid desiccant solution that has to be cooled down using a heat exchanger before the cooled regenerated liquid desiccant solution regains its original ability to dry air. This additional step reduces the efficiency of the overall system.

Some other proposed methods to regenerate diluted liquid desiccant involve the use of membranes in evaporation modes for dehydrating organic liquids. Such a method is describe din U.S. Pat. No. 4,802,988. This publication discloses polyvinyl alcohol membranes and processes for treating liquid desiccant solutions to reduce the absorbed moisture content in the liquid desiccant solution to low levels. Another publication, which is U.S. Pat. No. 5,350,519 discloses a process that uses a condenser to condense the liquid desiccant stream and to recover liquid hydrocarbon components. This process is then followed by a pervaporation step of the waste aqueous stream to recover additional hydrocarbon components and vent a hydrocarbon depleted liquid desiccant stream.

Hence, those skilled in the art are constantly looking for ways to devise a liquid desiccant dehumidification system that is able continuously absorb moisture from air or gas whereby the diluted liquid desiccant is effectively and efficiently regenerated so that the dehumidification system may be continuously used.

SUMMARY OF INVENTION

The above and other problems in the art are solved and an advance in the art is made in accordance with this invention.

A first advantage of a system in accordance with this invention is that the system is provided with a regeneration module that is able to remove moisture from the diluted liquid desiccant effectively and efficiently thereby regenerating the liquid desiccant. The regenerated liquid desiccant may then be reused in a dehumidifying module to absorb moisture from humid gas or air.

A second advantage of a system in accordance with this invention is that as the diluted liquid desiccant is continuously regenerated, the system may continuously dehumidify air without the need for the liquid desiccant to be removed from the system or changed.

A third advantage of a system in accordance with the invention is that the membrane distillation module utilized in the regeneration module ma be cascaded and increased as required thereby increasing the regenerative capability of the regeneration module.

A fourth advantage of a system in accordance with this invention is that the temperature of the diluted liquid desiccant does not need to be greatly increased thereby negating the requirement of a cooling stage after the liquid desiccant has been regenerated.

A fifth advantage of a system in accordance with this invention is that the components within this system, including the membrane module, are all immune to the corrosive effects of the liquid desiccant.

In accordance with embodiments of this invention a system is provided for dehumidifying gas comprising a dehumidifying module including a chamber having an airflow path between a gas inlet and a gas outlet, and a media material positioned between the airflow path, a liquid desiccant inlet arranged to provide liquid desiccant to the media material, and a liquid desiccant outlet. The system also includes: a regeneration module having a diluted liquid desiccant inlet, a regenerated liquid desiccant outlet, and a membrane distillation module comprising: a first condensation sheet having a distillate side, and having a feed side being adapted to be in fluid communication with diluted liquid desiccant, heating means for heating the diluted liquid desiccant after the diluted liquid desiccant has passed through the feed side of the first condensation membrane, a first distillation membrane having a distillate side and a distilland side, wherein the distillate side of the first distillation membrane faces the distillate side of the first condensation sheet, the distilland side being adapted to receive and to be in fluid communication with the heated diluted liquid desiccant, a first condensation chamber formed between the distillate side of the first distillation membrane and the distillate side of the first condensation sheet, the first condensation chamber having an upper section provided with a first extraction outlet, and a lower section provided with a first collection outlet, the first extraction and collection outlets being connected to vacuum generating means. In addition to the above, the system also includes: first connection means connecting the liquid desiccant outlet of the dehumidifying module to the diluted liquid desiccant inlet of the regeneration module so that diluted liquid desiccant may flow from the dehumidifying module into the regeneration module; and second connection means connecting the regenerated liquid desiccant outlet of the regeneration module to the liquid desiccant inlet of the dehumidifying module so that regenerated liquid desiccant my flow from the regeneration module into the dehumidifying module.

In accordance with embodiments of the invention, the liquid desiccant contained in the dehumidifying module comprises a solution having a salt concentration between 70 and 90 weight percentage lithium chloride and between 30 and 10 weight percentage calcium chloride.

In accordance with embodiments of the invention, the membrane distillation module further comprises a second condensation sheet having a distillate side and a feed side, the feed side being adapted to be in fluid communication with the diluted liquid desiccant, a second distillation membrane having a distillate side and a distilland side, wherein the distillate side of the second distillation membrane faces the distillate side of the second condensation sheet, the distilland side being adapted to receive and to be in fluid communication with the heated diluted liquid desiccant, and wherein the distilland side of the second distillation membrane faces the distilland side of the first distillation membrane, a second condensation chamber formed between the distillate side of the second distillation membrane and the distillate side of the second condensation sheet, the second condensation chamber having an upper section provided with second extraction outlet, and a lower section provided with a second collection outlet, the first extraction and collection outlets being connected to the vacuum generating means.

In accordance with embodiments of the invention, the distilland side of the first distillation membrane comprises hydrophobic electrospun nanofiber layer, and the distillate side comprises a hydrophilic backing layer. In other embodiments of the invention, any other commercial microporous hydrophobic membranes may also be utilized as the first distillation membrane.

In accordance with embodiments of the invention, the media material comprises nanofibre coated nylon substrates.

In accordance with embodiments of the invention, the media material is arranged to have a plurality of folds and at leas tone gap between adjacent folds, the media material being arranged in the chamber such that the airflow path flows in a direction parallel to the folds of the media material.

In accordance with embodiments of the invention, the system further comprises a controller provided at the first connection means for stopping diluted liquid desiccant from flowing from the dehumidifying module into the regeneration module, the controller being controlled by a humidity sensor provided at the gas outlet. In accordance with this embodiment of the invention, the system further comprises third connection means connecting the controller to the liquid desiccant inlet of the dehumidifying module so that diluted liquid desiccant may flow from the controller into the dehumidifying module when the diluted liquid desiccant is stopped from flowing into the regeneration module.

In accordance with embodiments of the invention, the system is provided with a membrane rejuvenation module that includes a deionized water module configured to provide deionized water to the diluted liquid desiccant inlet of the regeneration module and to receive the deionized water from the regenerated liquid desiccant outlet of the regeneration module when the first controller stops the flow of diluted liquid desiccant from the dehumidifying module and when the second controller stops the flow of regenerated liquid desiccant in the dehumidifying module, and an acidic water module configured to provide acidic water to the diluted liquid desiccant inlet of the regeneration module and to receive the acidic water from the regenerated liquid desiccant outlet of the regeneration module when the flow of diluted liquid desiccant from the dehumidifying module is stopped, when the flow of regenerated liquid desiccant into the dehumidifying module is stopped and when the flow of deionized water from the deionized water module to the regeneration module is stopped.

In accordance with embodiments of the invention the system further comprises a cooler provided between the regenerated liquid desiccant outlet and the liquid desiccant inlet, the cooler configured to cool the regenerated liquid desiccant from the regeneration module before the cooled regenerated liquid desiccant is directed into the dehumidifier module.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a system for continuously dehumidifying humid gas. More particularly, this invention relates to a system that continuously dehumidifies gas using a liquid desiccant dehumidifying module, a regeneration module for regenerating diluted liquid desiccant and means for connecting the two modules together. Still more particularly, the regeneration module is provided with a vacuum air gap membrane distillation module wherein the membrane distillation module is utilized to regenerate the diluted liquid desiccant.

The system in accordance with embodiments of this invention is able to utilize a liquid desiccant solution to absorb water vapour from air, remove moisture from the water-saturated liquid desiccant thereby regenerating the liquid desiccant and return the regenerated liquid desiccant back into the dehumidifying module. The regenerated liquid desiccant in the dehumidifying module may then be reused to absorb moisture from humid gas or air. Furthermore, the system in accordance with embodiments of this invention is also able to regenerate the liquid desiccant in the system in an almost continuous manner meaning that the system may almost continuously dehumidify air without the need for the liquid desiccant to be replaced or changed. The temperature of the diluted liquid desiccant also does not need to be substantially increased thereby negating the need of passing the regenerated liquid desiccant through a cooling stage after the liquid desiccant has been regenerated. In addition, the membrane distillation module utilized in the regeneration module may be cascaded and increased as required thereby increasing the regenerative capability of the regeneration module.

Figure 1:
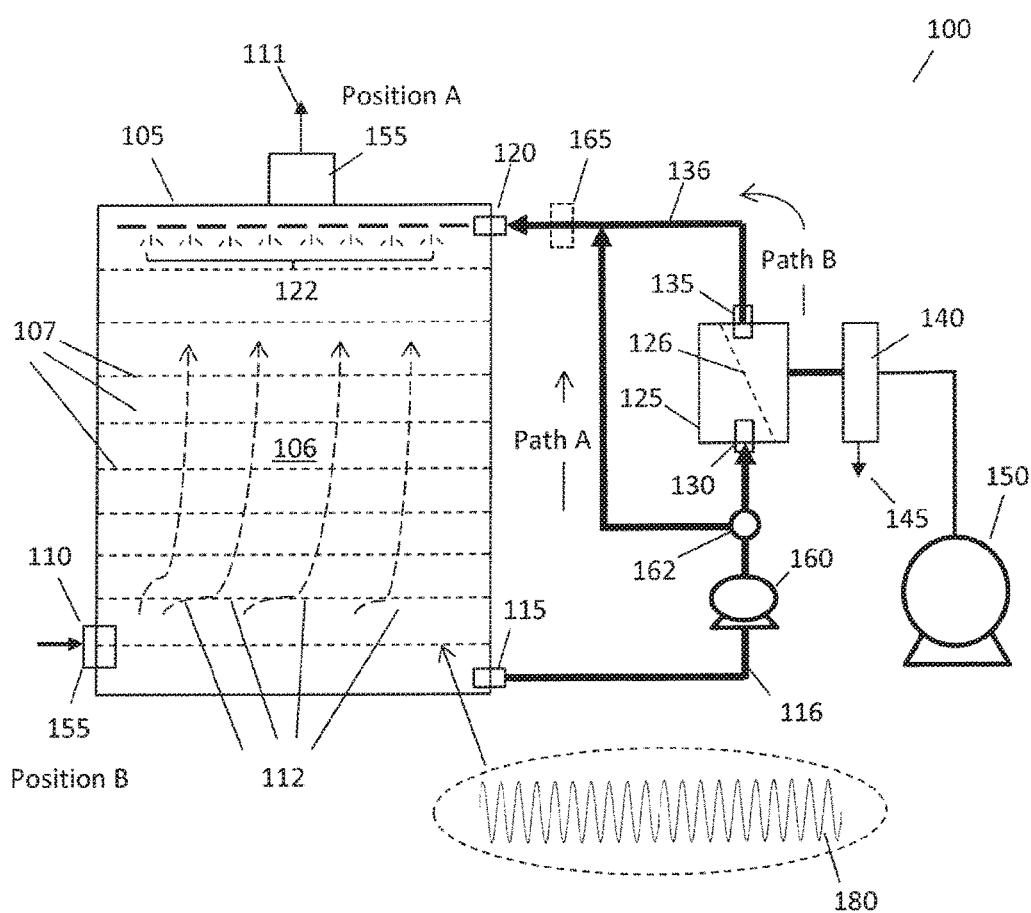
FIG. 1 illustrating a liquid desiccant dehumidification system in accordance with an embodiment of this invention.

A liquid desiccant dehumidification system in accordance with embodiments of this invention includes a dehumidification module, a regeneration module and means for connecting these tow modules together. The regeneration module is further provided with a membrane distillation module that is adapted to remove water vapour from the diluted liquid desiccant as the diluted liquid desiccant passes through the regeneration module. FIG. 1 illustrates such a liquid desiccant dehumidification system. Liquid desiccant dehumidification system 100 includes dehumidification module 105, regeneration module 125, water collector module 140 and vacuum pump 150 connected to regeneration module 125 whereby pump 150 is utilized to generate a vacuum for membrane distillation module 126.

As illustrated in FIG. 1, dehumidification module 105 is provided with gas inlet 110 and gas outlet 111. Gas outlet 111 is connected to supply fan 155. Supply fan 155 may be provided at position A and/or position B. When supply fan 155 is switched on, this fan generates a flow of air from gas inlet 110 to gas outlet 111. This effectively generates an airflow path, i.e. airflow path 112, between gas inlet 110 and gas outlet 111. Humid air from gas inlet 110 follows airflow path 112, through chamber 106, and leaves chamber 106 via gas outlet 111. Media materials 107 comprising sheets of porous materials that are adhesive to liquid droplets are arranged within chamber 106, across airflow path 112, so that as the humid air flows from gas inlet 110 to gas outlet 111, the humid air will have to contact media materials 107 as the humid air passes through chamber 106. In embodiments of the invention, media materials 107 may comprise nylon substrates having an average fibre diameter of 50 μm or nanofibre coated nylon substrates having an average fibre diameter of 0.5 μm.

In accordance with embodiments of the invention, media material 107 may comprise of a thin material that is arranged to resemble an accordion. This embodiment is illustrated in FIG. 1 as accordion arrangement 180. Accordion arrangement 180 may comprise of nylon substrates or nanofibre coated nylon substrates. The configuration of accordion arrangement 180 is advantageous because this arrangement maximizes the surface area of the material that is exposed to humid air flowing from gas inlet 110 to gas outlet 111. In particular, the configuration of accordion arrangement 180 is such that the media material is arranged to have a plurality of folds and there will be at least one air gap between each adjacent fold. Furthermore, accordion 180 may be arranged within chamber 100 such that airflow path 112 flows in a direction that is almost parallel to the folds in accordion 180.

The exact thickness of the media material as well as the configuration of accordion 180 may be adjusted to achieve the required dehumidification rate. For example, thinner sheets of material with larger air gaps between adjacent folds results in an increase in the flow of air through camber 106. However, such a configuration limits the amount of water vapour that may be extracted from the humid air. Conversely, thicker sheets of material with smaller air gaps between adjacent folds results in a decrease in the flow of air through chamber 106. However, this configuration results in an increase in the amount of water vapour absorbed as the humid air will have to pass through a larger surface area of the material before the humid air may exit chamber 106. The exact workings of this arrangement will be discussed in greater detail in the following sections.

In further embodiments of the invention, the surface of media materials 107 may be altered using various methods known to persons skilled in the art to increase the surface area of media materials 107 with the objective of increasing the retention of the liquid desiccant by the surfaces of the media material.

With reference to FIG. 1, it can be seen that dehumidification module 105 is also provided with liquid desiccant outlet 115, and liquid desiccant inlet 120. Liquid desiccant inlet 120 is connected to pipe 122, which is provided with spray nozzles for spraying regenerated liquid desiccant from regeneration module 125 (via Path B) or for spraying liquid desiccant obtained from outlet 115 (via Path A) into chamber 106 of dehumidification module 105. These nozzles are arranged such that they shower a fine spray of liquid from pipe 122 across the interior of chamber 106. As chamber 106 is filled with media materials 107, the liquid desiccant sprayed from the nozzles of pipe 122 will coat media materials 107. In embodiments of the invention, cooler 165 may be provided at the input to liquid inlet 120. Cooler 165 may then be used to cool the liquid desiccant before the liquid desiccant is provided to liquid inlet 120.

The sprayed regenerated liquid desiccant will first coat media materials 107 located nearest to pipe 122. The regenerated liquid desiccant will then slowly percolate downwards across the various layers of media materials 107 towards the bottom of dehumidifier 105. The liquid desiccant that has percolated through the various layers of media material 107 will then pool at the bottom of chamber 106 before this collected liquid is extracted out of chamber 106 via liquid desiccant outlet 115.

To recap, media material 107 is arranged such that as humid air from gas inlet 110 flows across chamber 106 to gas outlet 111, the humid air will have to contact the liquid desiccant soaked media materials 107. Liquid desiccant coating the various layers of media material 107 will then absorb moisture or wager vapours from the humid air. As the liquid desiccant absorbs the water vapours from the humid air, the liquid desiccant gradually becomes diluted. The diluted liquid desiccant would have a lower viscosity than normal liquid desiccants as such, the dilated liquid desiccants would penetrate through the various media materials at a faster rate, eventually pooling at the bottom of chamber 106. The diluted liquid desiccants are then extracted out of dehumidifier 105 via liquid desiccant outlet 115 for further processing. The air extracted out via gas outlet 111 would be the dry and cool air as heat and water vapours would have been extracted from the original humid air b the liquid desiccants in chamber 106 as the air flowed through chamber 106 via airflow path 112.

In accordance with embodiments of the invention, when media material 107 is arranged as accordion arrangement 180, this arrangement increases the amount of water vapour that can be removed from the humid air. This is because this arrangement presents a larger area of the media material, which is thoroughly coated with the liquid desiccant, to the humid air. Further, it should be noted that when the size of the gaps between the folds of media material is reduced and when the thickness of the media material is increased, this results in an increase in the amount of water vapour that may be absorbed from the humid air. However, this configuration results in a pressure drop within chamber 106 which in turn requires supply fan 155 to be provided with more power so that supply fan 155 may maintain the airflow between inlet 110 and outlet 111. As such, there is a trade-off between the dehumidification rate and the energy efficiency of the system.

With reference to FIG. 1, it is shown that regeneration module 125 is provided with diluted liquid desiccant inlet 130, regenerated liquid desiccant outlet 135 and membrane distillation module 126. The inner workings of membrane distillation module 126 will be described in further detail below with reference to FIGS. 2-5.

First connecting means 116 connects liquid desiccant outlet 115 to diluted liquid desiccant inlet 130 while second connecting means 136 connects regenerated liquid desiccant outlet 135 to liquid desiccant inlet 120. In embodiments of the invention, the first and the second connecting means may comprise corrosion resistant tubing such as plastic tubing. One skilled in the art will recognize that the first and/or second connecting means may comprise tubings made from any material that is able to withstand the corrosive nature of the ionic salts—lithium chloride or calcium chloride, without departing from this invention.

In operation, a liquid desiccant solution is first sprayed from the nozzles of pipe 122 across media materials 107 contained within chamber 106. The sprayed liquid desiccant will soak the layers of media materials 107 located closest to pipe 122 before soaking downwards through to the other layers, eventually pooling at the bottom of chamber 106. In embodiments of the invention, the liquid desiccant solution may comprise a solution having a weight ratio of ionic salts to water of about 50:50. In a preferred embodiment of the invention, the liquid desiccant solution may comprise a solution having a weight ratio of ionic salts to water of about 42.5:57:5. Further, the ionic salts component of the solution may comprise between 70 and 90 weight percent of lithium chloride (LiCl) and between 30 and 10 weight percent of calcium chloride ($CaCl_2$) accordingly.

Once all the media material within chamber 106 has been thoroughly coated with the liquid desiccant solution, humid air will then be directed into chamber 106 through gas inlet 110. As the humid air comes into contact with the liquid desiccant coated media materials in chamber 106, the liquid desiccant solution will absorb water vapour from the humid air thereby drying and cooling the air. The drier air is then drawn to the top of dehumidification module 105 using supply fan 155 whereby the dry air is then expelled out of dehumidification system 100. In embodiments of this invention, this dry air may be further cooled before the cooled dry air is further utilized to bring the ambient temperature of a room down.

In an embodiment of the invention a humidity sensor is provided at gas outlet 111. When the humidity sensor detects that a minimum level of dehumidification is not achieved by dehumidification module 105, this humidity sensor will inform controller 162, which is provided at first connecting means 116 that the membranes within membrane distillation module 120 are to be rejuvenated.

In accordance with embodiments of the invention, a conductivity sensor may also be provided at liquid inlet 120. The function of this conductivity sensor is to determine the conductivity level of the liquid desiccant that is being provided to pipe 122. When the conductivity sensor detects that the liquid desiccant being provided to pipe 122 has reached a minimum conductivity level, this conductivity sensor will inform controller 163 that the liquid desiccant has been sufficiently regenerated. A person skilled in the art will understand that when liquid desiccant becomes diluted, the conductivity of the liquid desiccant will reduce. Conversely, when the liquid desiccant is regenerated, the conductivity of the liquid desiccant will increase.

System 100 utilizes pump 160 to extract the liquid desiccant pooled at the bottom of chamber 106. The liquid desiccant extracted out via outlet 115 is then directed to controller 162. Based on the data transmitted from the humidity sensor, controller 162 will determine if the extracted liquid desiccant may flow along Path A or Path B. If controller 162 determines that the humidity of the air at gas outlet 111 is within acceptable levels, controller 162 will direct the flow of the liquid desiccant into Path A. When the liquid desiccant flows along Path A, the extracted liquid desiccant is not processed and is directed back into chamber 106 via liquid inlet 120 and pipe 122.

Alternatively, if controller 162 determines that the humidity of the air at gas outlet 111 is not within acceptable levels, i.e., the liquid desiccant in chamber 106 has become too diluted; controller 162 will direct the flow of the liquid desiccant from outlet 115 into Path B. Such a situation will typically occur when the system has been in operation for a certain amount of time. At this stage, the liquid desiccant solution in chamber 106 would have become water-saturated from all the absorbed water vapour. Further, the latent temperature of the liquid desiccant solution would have increased thereby reducing the liquid desiccant's ability to absorb water vapour.

At Path B, the diluted liquid desiccant is directed into regeneration module 125. One skilled in the art will recognize that the phrase "diluted liquid desiccant" refers to a liquid desiccant solution that has absorbed water vapour thereby becoming a diluted solution. As the diluted liquid desiccant passes through membrane distillation module 126 contained within regeneration module 125, water vapour molecules will evaporate from the diluted liquid desiccant. These evaporated water vapour molecules are removed from membrane distillation module 126 and are collected using water collector module 140. The water collected in water collector module 140 is then removed from the system via water outlet 145. After the diluted liquid desiccant has passed through membrane distillation module 126, the resulting liquid desiccant would be regenerated as the previously absorbed water vapour molecules would have been removed from the liquid desiccant b membrane distillation module 126. The regenerated liquid desiccant is then drawn out from regeneration module 125 via regenerated liquid desiccant outlet 135. The regenerated liquid desiccant will then be provided to dehumidification module 105 via liquid desiccant inlet 120. The conductivity sensor provided at liquid inlet 120 will continuously measure the conductivity of the liquid desiccant provided to inlet 120. After the diluted liquid desiccant has passed through regeneration module 125 a few times, the conductivity of the liquid desiccant would have increased. Once the conductivity of the liquid desiccant reaches an acceptable level, the conductivity sensor will inform controller 162 accordingly and controller 162 will then switch the flow of the liquid desiccant from Path B to Path A.

Figure 2:
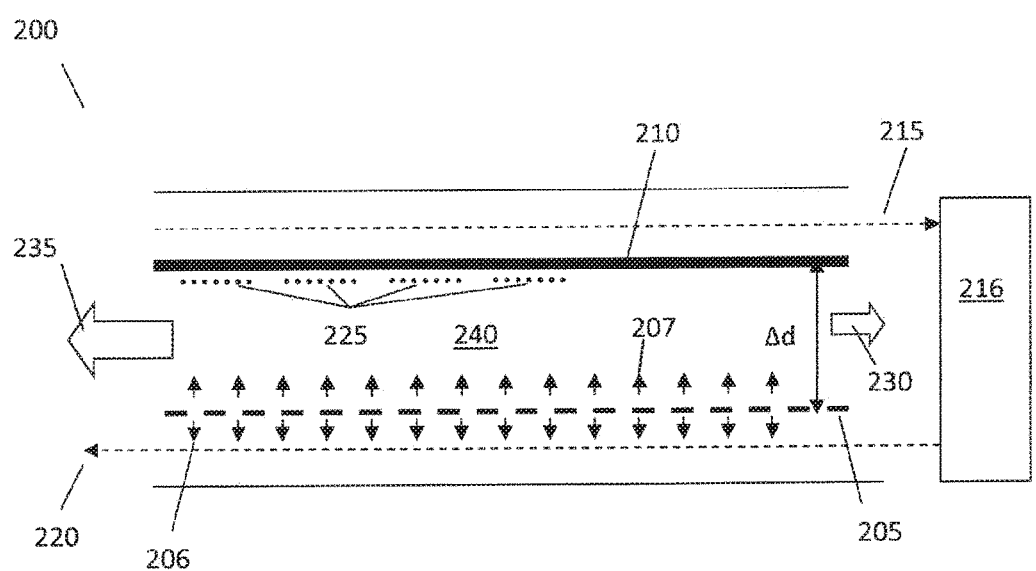
FIG. 2 illustrating singe cell membrane distillation module in accordance with an embodiment of this invention.

An embodiment of a membrane distillation module in accordance with embodiments of this invention is illustrated in FIG. 2. In particular, FIG. 2 illustrates a single cell Vacuum Air Gap Membrane Distillation (VAGMD) module whereby the module is provided with distillation membrane 205, condensation sheet 210, a cavity for diluted liquid desiccant solution 215, a cavity for heated diluted liquid desiccant 220, condensation chamber 240 and heat exchanger 216. As illustrated in FIG. 2, the condensation chamber is bounded on either side by distillation membrane 205 and condensation sheet 210. Heat exchanger 216 is used to heat diluted liquid desiccant 215 after the diluted liquid desiccant has passed through the feed side of condensation sheet 210. Heated diluted liquid desiccant 220 is then directed to flow to the distilland side of distillation membrane 205. Heat exchanger 216 may be any device that may be used to alter the temperature of liquids such as water heaters powered by renewable energy sources (e.g. solar energy) or by regular energy sources (e.g. gas, electricity). One skilled in the art will recognize that heat exchanger 216 may comprise any means for heating and/or cooling liquids without departing from this invention.

With regard to distillation membrane 205, the distilland side of distillation membrane 205 is in fluid communication with heated diluted liquid desiccant 220 and the distillate side of distillation membrane 205 faces the distillate side of condensation sheet 210. The distilland side of distillation membrane 205 is illustrated by arrows 206 and the distillate side of distillation membrane 205 is illustrated by arrows 207. Distillation membrane 205 may comprise any vapour permeable, liquid tight membrane with sufficiently high liquid entry pressure barriers. The membranes must have sufficiently high liquid entry pressure barriers to ensure that the pores of the membranes are not wetted when the pressure difference across the membrane is increased. An example of such a membrane would be a triple layer composite nanofiber membrane as disclosed in FIG. 4. The composite nanofiber membrane will be discussed in greater detail below.

Condensation sheet 210 may include any type of non-permeable, heat conducting non-porous sheet such as a polyester sheet, polypropylene sheet or a Polytetrafluoroethylene (PTFE) sheet. The function of condensation sheet 210 is to provide a surface for the condensation of water vapours contained within condensation chamber 240. The feed side of condensation sheet 210 is in fluid communication with diluted liquid desiccant 215 and the distillate side of condensation sheet 210 faces the distillate side of distillation membrane 220. Additionally, the distance, $\Delta d$, between the distillate side of distillation membrane 205 and the distillate side of condensation sheet 210 has to be chosen carefully as distance $\Delta d$ affects the performance of VAGMD module 200. In particular distance, $\Delta d$ contributes to the mass transfer resistance of VAGMD module 200. In operation, when distance $\Delta d$ is increased, the permeate flux of the module will increase until the permeate flux reaches a peak. Once the permeate flux of the module reaches this peak, the permeate flux of the module reduces as distance $\Delta d$ increases. The decrease in the module's permeate flux is attributed to the increase in mass transfer resistance as distance $\Delta d$ increases. The relationship between $\Delta d$ and the permeate flux of the system is shown in Table 1 below.

TABLE 1

| Distance, $\Delta d$, (mm) | Flux (LMH) when Heated Liquid Desiccant is at 80° C. |
| --- | --- |
| 1 | 39.21 |
| 3 | 51.69 |
| 5 | 46.30 |

In operation, diluted liquid desiccant 215 is brought into fluid contact with the feed side of condensation sheet 210. Vacuum pump 150 (as illustrate din FIG. 1) is then used to supply a vacuum pressure to collection outlet 235 and extraction outlet 230 resulting in a partial vacuum forming within condensation chamber 240. Evaporated water vapour molecules will drift and diffuse across distillation membrane 205, from heated diluted liquid desiccant 220 to condensation chamber 240, due to the temperature difference and pressure difference between condensation chamber 240 and diluted liquid desiccant 220. The water vapour within condensation chamber 240 will condense on the distillate side of condensation sheet 210 forming condensate 225. Condensate 225 is collected at collection outlet 235. Any non-condensable gases contained within condensation chamber 240 is extracted out through extraction outlet 230.

Non-condensable gases may comprise gases that are dissolved in heated diluted liquid desiccant 220 such as carbon dioxide from the thermal decomposition of bi-carbonate. Non-condensable gases are detrimental to any membrane distillation module as these gases may clog or block the distillation membrane's pores. This in turn results in a reduction of the module's vapour flux due to the reduction in the condensation heat transfer coefficient of the system. The presence of non-condensable gases within a membrane distillation module may also cause an increase in the mass transfer resistance of the module which in turn causes the vapour transport rate to be mass transfer limited.

If only a single outlet were to be utilized for both the extraction of the non-condensable gases and for the collection of the condensate, the non-condensable gases would not be able to be removed sufficiently as the condensate would plug up the single outlet. As such, in VAGMD module 200, the non-condensable gases are removed primarily though extraction outlet 230 while the condensate is collected at collection outlet 235. When the non-condensable gases are removed from condensation chamber 240 and from the pores of distillation membrane 205 in VAGMD module 200, the vapour pressure difference between heated diluted liquid desiccant 220 and condensation chamber 240 will increase across distillation membrane 205. This in turn results in an increase in the membrane distillation flux of VAGMD module 200. The increased vapour pressure difference across distillation membrane 205 assists in the removal of water molecules and $CO_2$ molecules that clog the pores of distillation membrane 205. By clearing the clogged pores of distillation membrane 205, this effectively reduces the tendency of membrane wetting and reduces the mass transfer resistance across distillation membrane 205. Water vapour may then pass freely through distillation membrane 205 to condense on the surface of condensation sheet 210 within condensation chamber 240. This condensation process ensures that the vapour density within condensation chamber 240 remains at a constant level.

Figure 3:
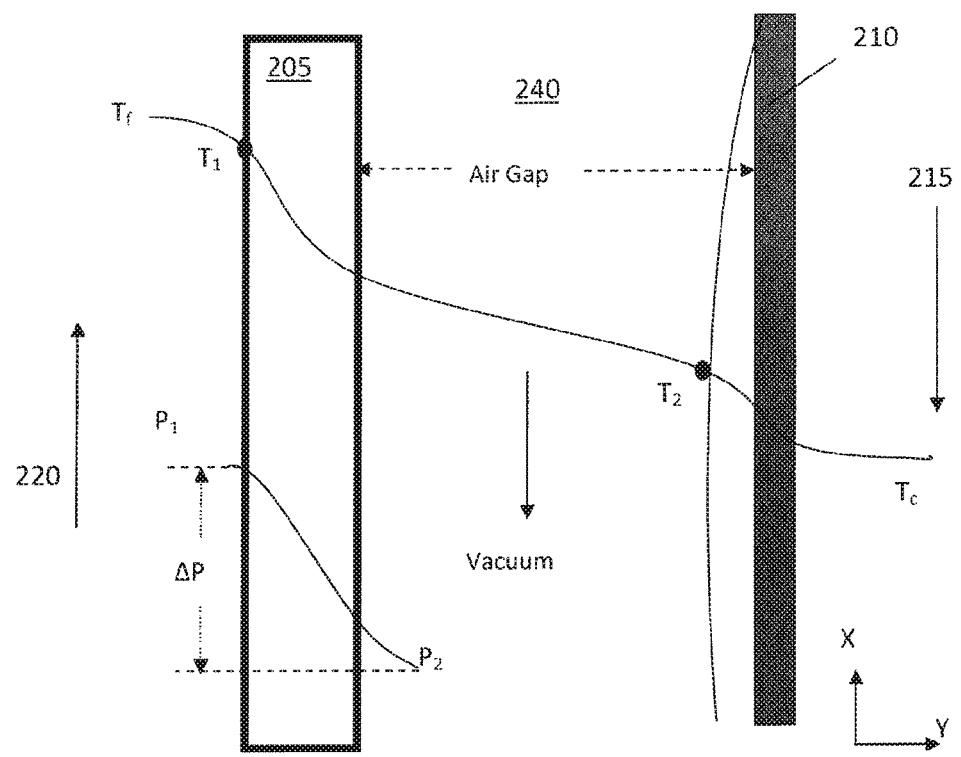
FIG. 3 illustrating the pressure and temperature distribution across a single cell of a membrane distillation module in accordance with an embodiment of this invention.

FIG. 3 illustrates the temperature profile across single cell VAGMD module 200. The vapour pressure profile across membrane 205 is illustrated in this diagram as well. As mentioned above, in operation, diluted liquid desiccant 215 is at a lower tempera rue than heated diluted liquid desiccant 220. As shown in FIG. 3, due to the temperature difference between diluted liquid desiccant 215 and heated diluted liquid desiccant 220, a temperature gradient profile exists between these two solution. Vaporized water molecules from heated diluted liquid desiccant 220 will diffuse across distillation membrane 205 to condensation chamber 240, which is at a lower temperature than heated diluted liquid desiccant 220. The steeper the temperature gradient is across distillation membrane 205, the faster the water molecules vaporize and drift across to condensation chamber 240. The water molecules then condense at the surface of condensation sheet 210 forming condensate 225 (as shown in FIG. 2). Due to the excellent heat conductivity of condensation sheet 210, the surface of condensation sheet 210 is maintained around the same temperature as diluted liquid desiccant 215.

Figure 4:
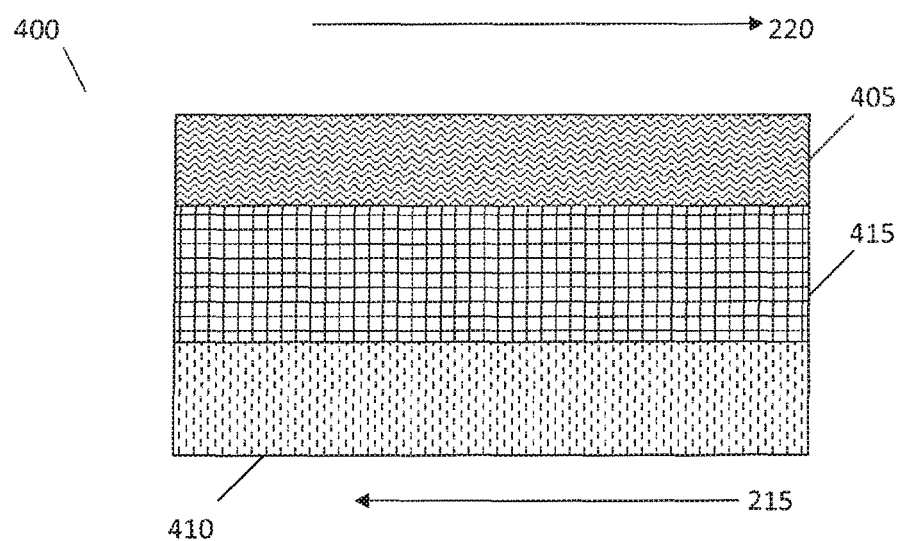
FIG. 4 illustrating a cross sectional view of a triple layer composite nanofiber membrane in accordance with an embodiment of this invention.

Additionally, a vacuum pressure is supplied to condensation chamber 240 creating a partial vacuum environment within condensation chamber 240. This results in the formation of a pressure gradient as shown in FIG. 3. As the pressure difference across distillation membrane 205 increases, the flux across distillation membrane 205 increase as well. Hence, in VAGMD module 200, there are two driving forces that affect the flux and distillation rate of the module. The driving forces are the temperature gradient across VAGMD module 200 and the vapour pressure gradient across distillation membrane 205. In typical membrane distillation modules, the pressure difference across the distillation membrane is typically minimized in order to avoid high mechanical and thermal loading of the distillation membrane which will lead to pore wetting. For this invention, in contrast with the practice adopted by typical membrane distillation modules, the pressure difference across distillation membrane 205 is maintained as large as possible to ensure that the flux across distillation membrane 205 is at the maximum allowable rate. Furthermore, the condensed water in condensation chamber 240 is continuously removed hence reducing the tendency of pore wetting of distillation membrane 205. Pore wetting of distillation membrane 205 may be avoided by using a triple layer composite nanofiber membrane as illustrated in FIG. 4. Hence, this invention is able to fully utilize both driving forces in order to achieve an efficient distillation module recovery rate and flux rate across the distillation membrane.

FIG. 4 illustrates triple layer composite nanofiber membrane 400 that may be used in accordance with an embodiment of this invention. A complete description of such a triple layer composite membrane is provided in PCT application No. PCT/SG2011/000407 in the name of Ngee Ann Polytechnic filed on 17 Nov. 2011. As illustrate din FIG. 4, the outer surface of electrospun nanofiber layer 405 is adjacent diluted liquid desiccant 220 while the outer surface of backing layer 410 is the distillate side facing the distillate side of condensation sheet 210. Microporous layer 415 acts as a filter, removing contaminants from the vapour evaporating from heated diluted liquid desiccant 220. The filtered vapour then diffuses across condensation chamber 240 and condenses at a surface of condensation sheet 210 where the temperature is lower. With the addition of electrospun nanofiber layer 405 at the heated diluted liquid desiccant side, the hydrophobicity of composite membrane 400 increases greatly. Due to the increased hydrophobicity contributed by electrospun nanofiber layer 405, composite membrane 400 may be used efficiently and effectively in membrane distillation applications as the pores in microporous layer 415 are now effectively protected by the much more hydrophobic nanofiber layer 405. In composite membrane 400, liquid-vapor interfaces from at the entrances of membrane pores at the border where heated diluted liquid desiccant 220 adjoins nanofiber layer 405 and, vapour-liquid interfaces form at the entrances of membrane pores at the border where microporous layer 415 adjoins backing layer 410. Evaporation takes place at the liquid-vapour interface where heated diluted liquid desiccant 220 adjoins nanofiber layer 405 and the water molecules diffuse across condensation chamber 240 to condensation sheet 210. Furthermore, as electrospun nanofibre layer 405 is immune to the corrosive properties of the liquid desiccant, this makes composite nanofibre membrane 400 ideal for use in such modules. It should be noted that in accordance with other embodiments of the invention, other types of commercial microporous hydrophobic membranes may also be utilized as the distillation membrane.

Electrospun nanofiber layer 405 may be formed on the first surface of microporous layer 415 using an electrospinning techniques. When micorporous layer 415 is manufactured using hydrophobic materials such as PVDF, the contact angle of microporous layer 415 is between 70° to 130°. Due to the contact angle of microporous layer 415, liquid droplets will still partially spread out across the surface of microporous layer 415. The spreading of liquid droplets across the membrane surface is deleterious for membrane distillation applications as the pores in microporous layer 415 will get water logged easily, rendering the membrane useless. By depositing electrospun nanofiber layer 405 onto the first surface of microporous layer 415, the hydrophobicity of the membrane increases greatly as the contact angle of nanofiber layer 405 is between 140° to 160°. Due to the extremely high hydrophobicity of nanofiber layer 405 formed on microporous layer 415, the pores of microporous layer 415 will not get water logged as easily. Nanofiber layer 405 has pore sizes between 0.05 µm to 5.0 µm.

Hence, by utilizing membrane 400 in embodiments of our invention, the pressure gradient across distillation membrane 205 may be fully utilized to increase the flux of the VAGMD module. Membrane 400, which is disclosed in PCT Application No. PCT/SG2011/000407, is incorporated herein with reference to the abovementioned PCT application.

Single cell VAGMD module 200 may be cascaded with another single cell VAGMD module to increase the overall regeneration rate of the diluted liquid desiccant. FIG. 4 illustrates such a dual cell VAGMD module. Dual cell VAGMD module 500 includes distillation membranes 205, 505, condensation sheet 210, 510, cavities for diluted liquid desiccant 215, 515, a cavity for heated diluted liquid desiccant 220, and condensation chambers 240, 540 that are bounded on either side by distillation membranes 205, 505 and condensation sheet 210, 510 respectively. In operation, diluted liquid desiccant 215, 515 are at a lower temperature than heated diluted liquid desiccant 220. A vacuum pressure supplied to collection outlets 235, 535 and extraction outlets 230, 530 will result in a partial vacuum forming within condensation chambers 240, 540. For dual cell VAGMD module 500, as flow solution 220 flows through between distillation membranes 205, and 505, evaporated water molecules drift and diffuse across distillation membranes 205, 505 to the respective condensation chambers. The rate of flux across distillation membrane 205 is equivalent with the rate of flux across distillation membrane 505. Hence, by cascading the two VAGMD cells together, this results in an increase in the overall flux and in the recovery rate of the overall module.

Figure 5:
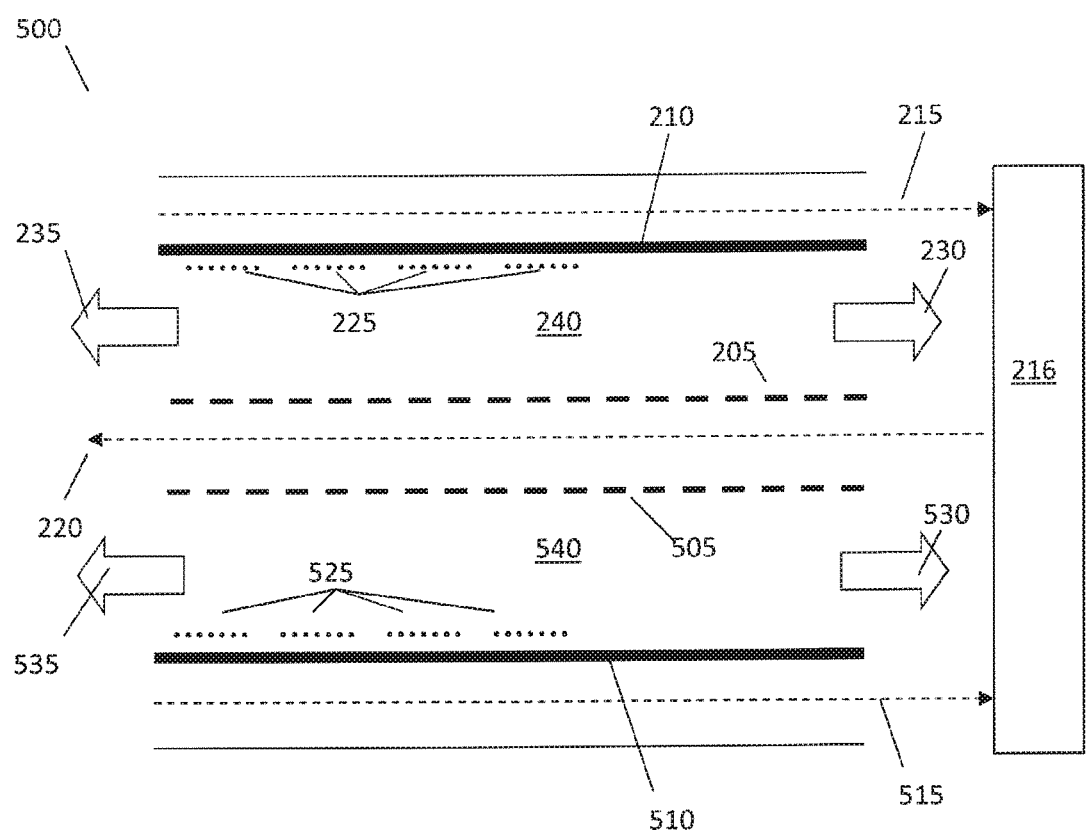
FIG. 5 illustrating a dual cell membrane distillation module in accordance with an embodiment of this invention.

In FIGS. 2 and 5, partial vacuum were applied to condensation chambers 240, 540 through collection outlets 235, 535 and extraction outlets 130, 430. In embodiments of the invention instead of using vacuum pump 150 as the vacuum generating means, a thermo-compressor may be used to produce the vacuum required for the system. One skilled in the art will recognize that a thermo-compressor may comprise an injector, ejector, steam ejector, steam injector, or Eductor-jet pump.

In accordance with another embodiment of the invention, in order to increase the energy efficiency of dehumidification system 100, heat exchanger 216 within membrane distillation module 126 may comprise of passive solar heating means. Specifically, diluted liquid desiccant 215 may be directed through a heating cavity that is directly exposed to the sun. The heating cavity may be made from materials that have excellent heat exchanging properties such as the materials use din condensation sheet 210. As diluted liquid desiccant 215 passes through the heating cavity, diluted liquid desiccant 215 is then heated using solar energy. Heated feed solution 215 is then dispensed as heated diluted liquid desiccant 220.

Figure 6:
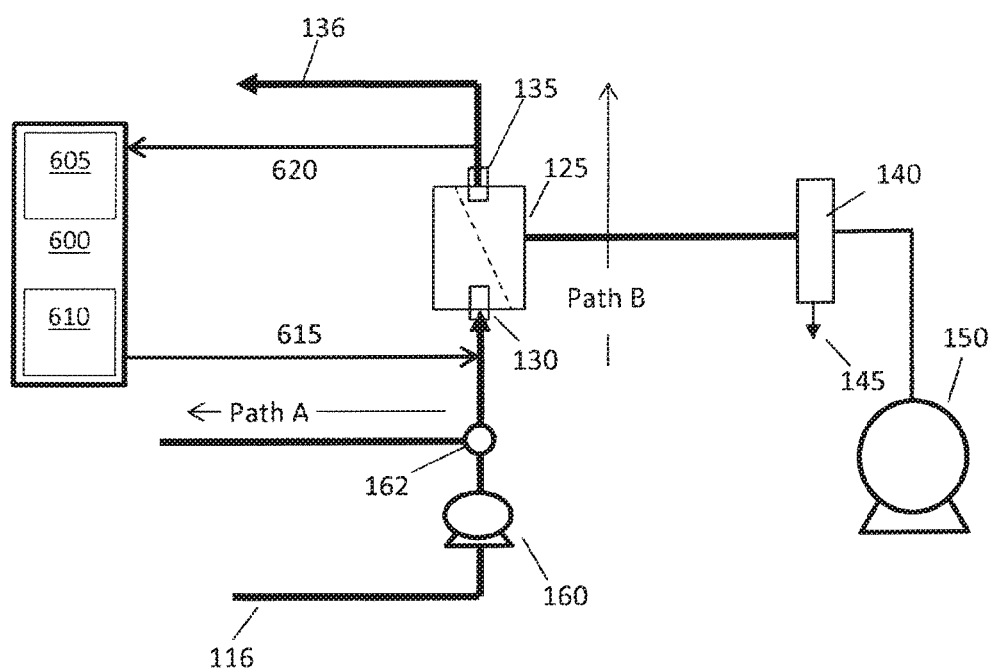
FIG. 6 illustrating a membrane rejuvenation module for a liquid desiccant dehumidification system in accordance with an embodiment of this invention.

After the liquid desiccant has been regenerated by regeneration module 125, the membrane located within regeneration module 125 will normally become scaled and/or fouled. In accordance with embodiments of the invention, the scaled/fouled membrane may be rejuvenated when the liquid desiccant is directed along Path A. Such a membrane rejuvenation module is illustrated in FIG. 6. When the liquid desiccant is directed along Path A, controller 162 will send a signal to membrane rejuvenation module 600 informing module 600 that the liquid desiccant is not flowing through regeneration module 125, i.e. not flowing through Path B. When this happens, deionized water module 605 may be triggered by module 600 to supply deionized water to regeneration module 125 via pipe 615. This acidic water will similarly enter regeneration module 125 through inlet 130. The flow of the acidic water across the membrane in regeneration module 125 will clean the surface of the membrane further. After the membrane has been rinsed with the acidic water, the acidic water will similarly exit via outlet 135 and return to acidic water module 610. As there may be some remnants of the acidic water on the surface of the membrane, deionized water module 605 will be triggered to supply deionized water to rinse the membrane in regeneration module 125 thereby completing the rejuvenation of the membrane.

The following experiments illustrate the various advantages of embodiments of the invention. One skilled in the art will recognize that the experiments carried out below are not exhaustive representation of the possible embodiments of this invention.

Experiment 1

This experiment illustrates how the liquid entry pressure (LEPw) of the membrane in regeneration module 125 is altered when the membrane is rinsed with deionized water and acidic water. This experiment may be carried out using the setup illustrated in FIGS. 1 and 6.

Controller 162 will first direct the flow of the liquid desiccant away from regeneration module 125, i.e. into Path A. Deionized water is then supplied from deionized water module 605 to regeneration module 125 for 15 minutes. In other words, the fouled/scaled membrane within regeneration module 125 is rinsed with deionized water for 15 minutes. The supply of deionized water is then stopped and acidic water is then supplied from acidic water module 6120 to regeneration module 125. The fouled/scaled membrane within regeneration module 125 is then rinsed with the acidic water for a further 15 minutes. The supplied acidic water may comprise of 100±20 PPM of HCl acid or 500 PPM of Citric acid. After 15 minutes has passed, the supply of the acidic water is stopped and deionized water is then supplied for a further 15 minutes to complete the rinsing and cleansing of the membrane in regeneration module 125.

TABLE 2

| Cleaning Process | CAw/° | LEPw/kPa |
| --- | --- | --- |
| Pre-cleaning step - Fouled/Scaled Membrane | 97.8 ± 2.8 | 110 ± 10 |
| Deionized water rinse - 15 minutes | 105.4 ± 3.2 | 270 ± 25 |
| Acidic water rinse - 15 minutes | 117.2 ± 4.1 | 330 ± 20 |
| Deionized water rinse - 15 minutes | 147.5 ± 3.8 | 460 ± 20 |

For reference, a clean membrane will typically have a water contact angle [CAw/°] of 152.3±4.2 and a LEPw of 480±20. As illustrated in Table 2, after a fouled/scaled membrane has undergone a rejuvenation process of being rinsed with deionized water, acidic water and again with deionized water, the membrane may be rejuvenated to achieve its original properties.

Experiment 2

This experiment compares the performance of dehumidification module 105 when nylon substrates are used as media material 107 and when nanofibre coated nylon substrates are used as media material 107. For this experiment, liquid desiccant is provided to pipe 122 at an average flow rate of 0.44 m³/hour and humid air with a temperature of 24.35° C. and 72% Relative Humidity (% RH) is provided at a flow rate of 9.85 m/s to gas inlet 110. A humidity sensor is provided at gas outlet 111 to record the humidity of the exiting air.

Figure 7:
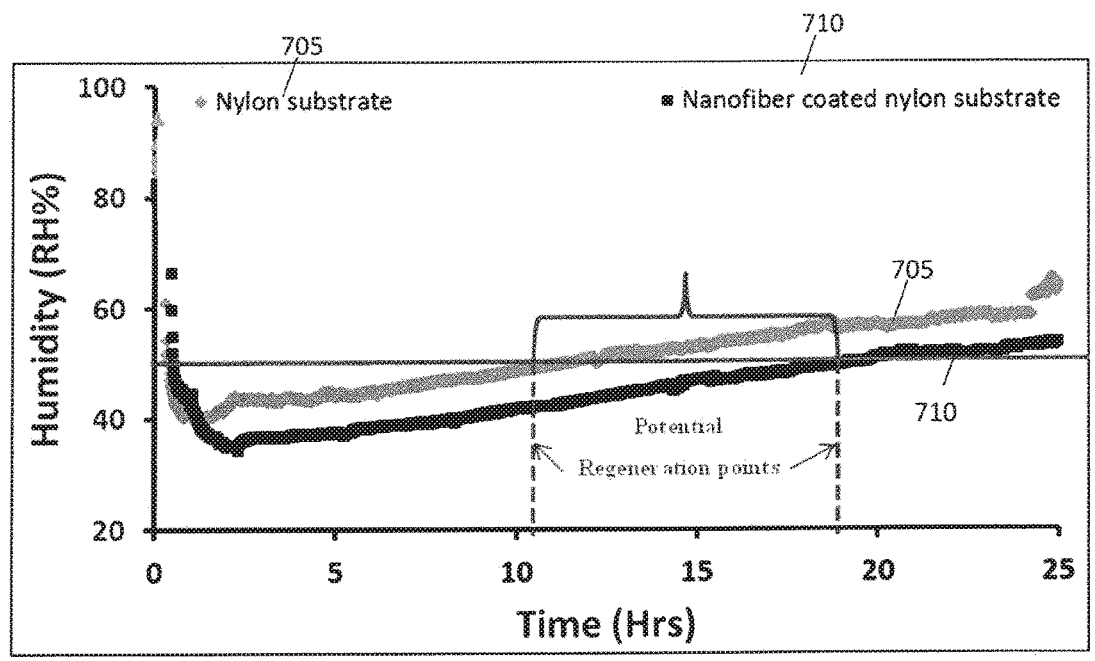
FIG. 7 illustrating plots of relative humidity of extracted air versus time for various type of membrane media.

The result obtained from this experiment is plotted in FIG. 7. The humidity of the air exiting gas outlet 111 is plotted on the Y-axis and the X-axis illustrates the amount of time that has lapsed since humidity was measured at gas outlet 111.

As illustrated in FIG. 7, it can be seen that dehumidification module 105 is above to achieve a higher dehumidification rate when module 105 is filled with media material comprising nanofibre coated nylon substrates. In particular, plot 710, which measures the humidity of air exiting gas outlet 111 when media material 107 comprises of nanofibre coated nylon substrates has lower relative humidity as compared to plot 705, which measures the humidity of air exiting gas outlet 111 when media material 107 comprises of nylon substrates. This is because nanofibre coated nylon substrates provide larger surface areas for the sprayed liquid desiccant solution to adhere to. This in turn increases the amount of water vapour that may be absorbed from the humid air as the humid air contacts the nanofibre coated nylon substrates that are coated with liquid desiccant solution.

Experiment 3

This experiment compares the performance of dehumidification module 150 when the concentration of the liquid desiccant solution is varied. This experiment may be carried out using part of the setup illustrated in FIG. 1. For this experiment, chamber 108 is filled with 100 ml of the liquid desiccant solution that is being tested and media material 107 is removed from chamber 106. Further, outlet 115 and inlet 120 are plugged, preventing the liquid desiccant solution from leaving chamber 106 for the duration of the experiment. During the course of the experiment, air is pumped at rate of 30 Liters/hour with a relative humidity of 75-79% at a temperature of 24° C. into gas inlet 110. A humidity sensor is also provided at gas inlet 110 to measure the humidity of the air entering chamber 106 and another humidity sensor is provided at gas outlet 111 to measure the humidity of the air exiting chamber 106.

For each concentration of liquid desiccant solution being tested, at one hour intervals, the humidity of air entering gas inlet 110 and the humidity of air exiting gas outlet 111 will be measured. Three readings were taken for each concentration and the averaged results obtained from gas outlet 111 are plotted in FIG. 8.

Figure 8:
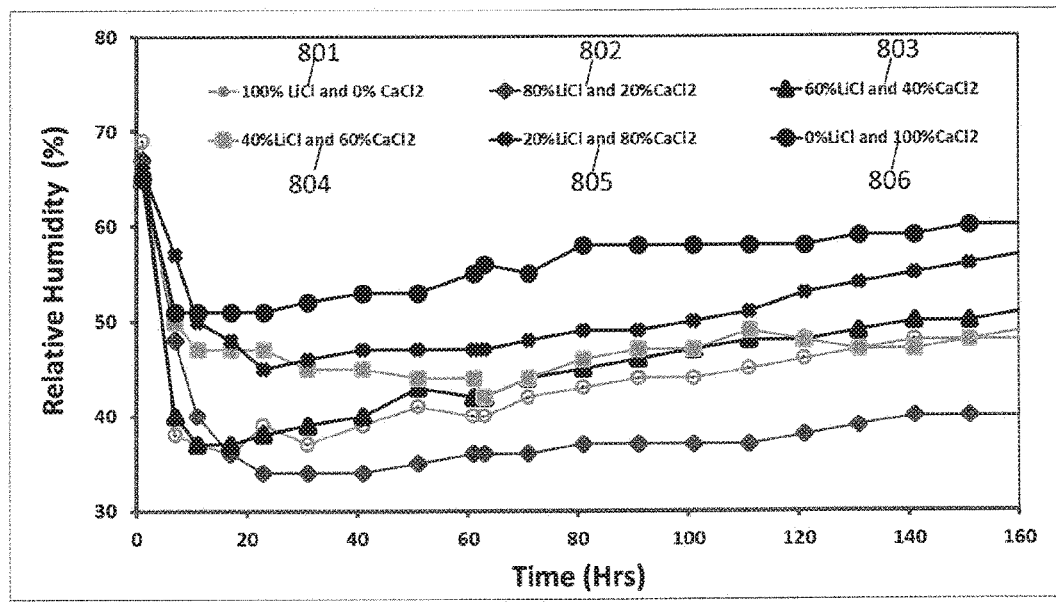
FIG. 8 illustrating plots of relative humidity of extracted air versus time when the salt concentration of LiCl and $CaCl_2$ are varied.

From the plots shown in FIG. 8, it can be seen that the liquid desiccant solution 802 with 80% wt LiCl and 20% CaCl₂ provides the ideal dehumidification characteristic as this salt concentration is able to achieve the highest dehumidification rate.

In general, monovalent ions contained within the desiccant LiCl absorbs the moisture faster (kinetics of absorption is fast) than the divalent ions contained within the desiccant CaCl₂. However, the quantity of absorption of the monovalent ion contained within the desiccant LiCl is lower as compared to the divalent ion contained within the desiccant CaCl₂. As such, when the monovalent ions contained within the desiccant LiCl were mixed together with the divalent ions contained within desiccant CaCl₂, this results in faster absorption kinetics; which in turn results in a higher moisture removal rate. In total, six combinations of these desiccant mixtures were tested and their respective concentrations are set out in Table 3 below.

TABLE 3

| Solution number | LiCl (wt %) | CaCl₂ (wt %) |
|---|---|---|
| 1 (801) | 100% | 0% |
| 2 (802) | 80% | 20% |
| 3 (803) | 60% | 40% |
| 4 (804) | 40% | 60% |
| 5 (805) | 20% | 80% |
| 6 (806) | 0% | 100% |

From the results illustrate din FIG. 8, it is shown that the desiccant solutions se tout in item (1)-(5) in Table 3 are able to reduce the relative humidity (% RH) of air to at least 50% except for the desiccant solution set out in item (6) in Table which comprises 100 wt % CaCl₂ salt concentration. These results show that the time required to achieve 50% RH generally shortens and the humidity difference between inlet and outlet air generally increases with an increase in LiCl concentration, except for solution 1, i.e. the 100 wt % LiCl solution, which exhibited a lower moisture removal rate as compared to solution 2 which comprises a solution of 80 wt % LiCl-20% CaCl₂.

Experiment 4

This experiment compares the performance of the liquid desiccant solution across various temperatures. For this experiment, a liquid desiccant solution of 100 ml was prepared. The prepared liquid desiccant solution comprises approximately 42.5 wt % concentration of salt while the remaining 57.5% wt comprises deionized water. The salt diluted in the deionized water comprises 80 weight percentage (80 wt %) of LiCl and 20 weight percentage (2 wt %) of CaCl₂ salt. This liquid desiccant solution is place din a closed-top cylinder that is provided with an air inlet and an air outlet. Humidity sensors are provided at the air inlet and air outlet. A thermometer is also provided at the air outlet to capture the temperature of the air exiting the cylinder.

A thermometer is inserted into through a stopper of the closed-top cylinder to measure the temperature of the liquid desiccant solution as humid air is directed into the cylinder and as dehumidified air is extracted from the cylinder. The cylinder is then placed within a water bath. The temperature of the water bath is controllable so that the temperature of the liquid desiccant solution within the cylinder may be adjusted to the required temperature. For this experiment, the liquid desiccant solution is cooled to 5° C., 10° C., 15° C. and 25° C.

Figure 9:
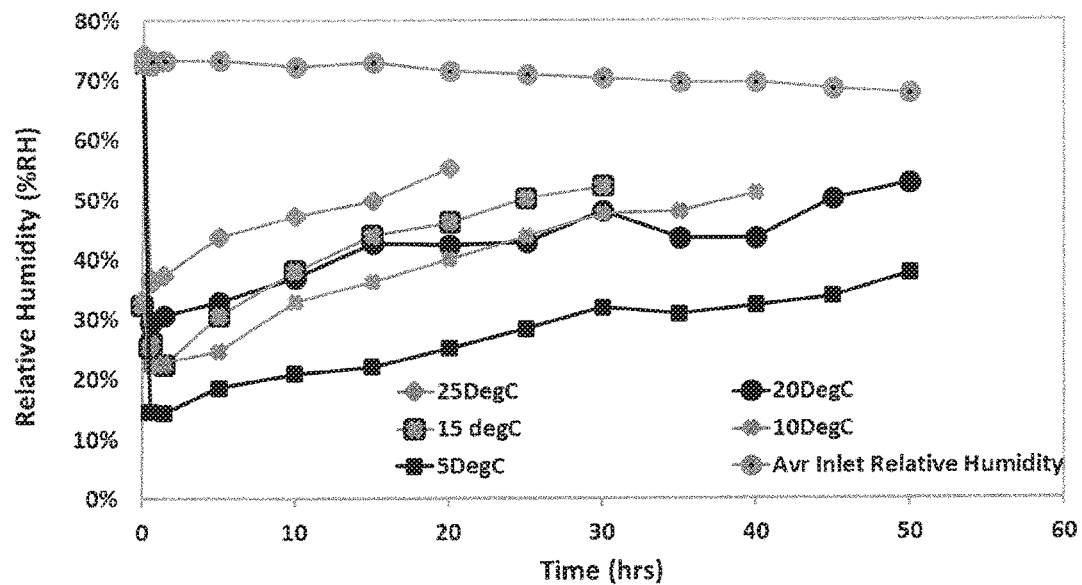
FIG. 9 illustrating plots of relative humidity of extracted air versus time when the temperature of liquid desiccant solutions are varied.

When the experiment is commenced, air is first pumped into the cylinder via the air inlet using an air pump at a flow rate of 3 Liters per minute. The air being pumped into the cylinder has about 70% relative humidity. As the humid air is being pumped into the cylinder, the humidity and the temperature of the air extracted from the air outlet are measured. The results obtained from this measurement are plotted in FIGS. 9 and 10. It should be noted that the graph illustrated in FIG. 9 illustrates on its y-axis the relatively humidity of the air extracted from the air outlet, while the x-axis illustrates the amount of time that has lapsed from the beginning of the experiment. As for FIG. 10, the y-axis shows the temperature of the air extracted from the cylinder while the x-axis illustrates the amount of time that has lapsed from the beginning of the experiment.

From the plots shown in FIG. 9, it can be seen that the achievable relative humidity of the dehumidified air becomes lower as the temperature of the liquid desiccant solution is lowered. Further, it should be noted that at lower temperatures, it takes the liquid desiccant solution a longer period of time before the humidity of the air at the outlet reaches 50% relative humidity levels. In other words, the results show that the dilution rate of the liquid desiccant solution is reduced at lower temperatures. It is also observed from the results that when the liquid desiccant solution is at 10° C. and 20° C., the dehumidification rate of the liquid desiccant solution is almost the same.

With the temperature of the liquid desiccant solution is at a lower temperature, the vapour pressure of the liquid desiccant solution is lowered as well. This enhances the mass transfer process between the humid air (which has the higher vapour pressure) and the liquid desiccant solution (which has the lower vapour pressure) thereby encouraging the liquid desiccant solution to absorb water vapours at a faster rate.

From the results shown in FIG. 9, it is shown that when the liquid desiccant solution is maintained at 5° C., the setup achieves the optimum dehumidification performance. Unfortunately, maintaining the liquid desiccant solution at 5° C. is not ideal because the salt solubility of the solution decreases when the temperature decreases. This means that when the liquid desiccant solution is maintained at 5° C., this increases the risk of crystallization of salt crystals in the liquid desiccant solution. Secondly, it is not energy efficient to maintain the liquid desiccant solution at 5° C.

Figure 10:
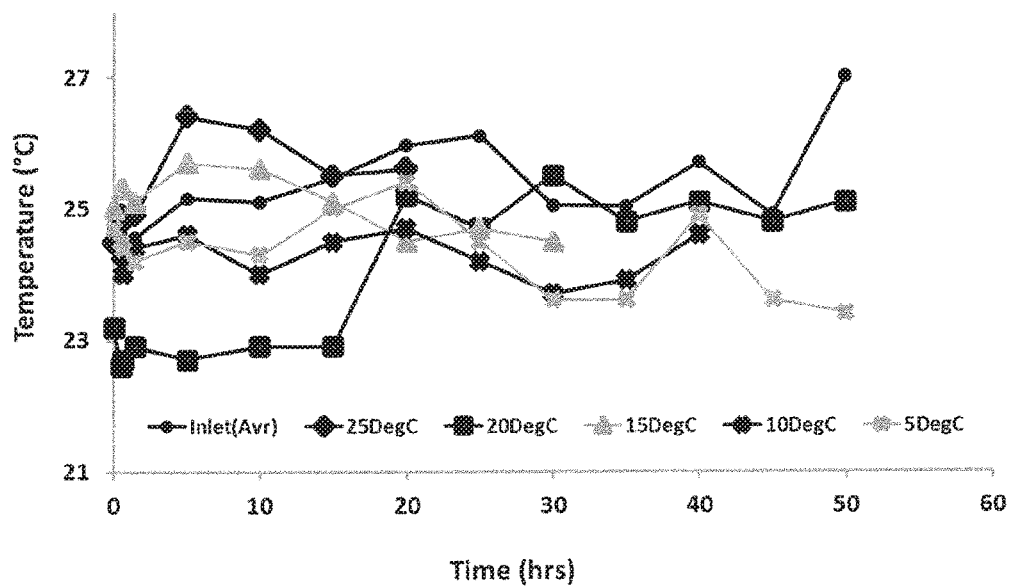
FIG. 10 illustrating plots of temperature of extracted air versus time when the temperature of the liquid desiccant solution is varied.

Thirdly, as shown in FIG. 10, even when the temperature of the liquid desiccant solution is lowered to 5° C., this does not result in a reduction of the temperature of the air extracted from the cylinder. As such, it would not be advantageous to lower the temperature of the liquid desiccant solution to as low as 5° C. From this experiment, it is determined that a good compromise would be to maintain the temperature of the liquid desiccant solution to 15±5° C.

The above is a description of a liquid desiccant dehumidification system which utilizes a Vacuum Air Gap Membrane Distillation (VAGMD) module to regenerate the diluted liquid desiccant. In operation, a partial vacuum is formed within the condensation chamber of the VAGMD module and non-condensable gases within this condensation chamber are extracted in order to improve the flux rate of the system. It is foreseen that those skilled in the art can and will design alternative embodiments of this invention as set forth in the following claims.

The invention claimed is:

1. A system for dehumidifying gas comprising: a dehumidifying module including:
   a chamber having an airflow path between a gas inlet and a gas outlet, and a media material positioned between the airflow path, a liquid desiccant inlet arranged to provide liquid desiccant to the media material, and a liquid desiccant outlet;
   a regeneration module having a diluted liquid desiccant inlet, a regenerated liquid desiccant outlet, and a membrane distillation module comprising:
      a first condensation sheet having a distillate side, and having a feed side being adapted to be in fluid communication with diluted liquid desiccant,
      a heater for heating the diluted liquid desiccant after the diluted liquid desiccant has passed through the feed side of the first condensation membrane,
      a first distillation membrane having a distillate side and a distilland side, wherein the distillate side of the first distillation membrane faces the distillate side of the first condensation sheet, the distilland side being adapted to receive and to be in fluid communication with the heated diluted liquid desiccant,
      a first condensation chamber formed between the distillate side of the first distillation membrane and the distillate side of the first condensation sheet, the first condensation chamber having an upper section provided with a first extraction outlet, and a lower section provided with a first collection outlet, the first extraction and collection outlets being connected to a vacuum generator,
   a first connector connecting the liquid desiccant outlet of the dehumidifying module to the diluted liquid desiccant inlet of the regeneration module so that diluted liquid desiccant may flow from the dehumidifying module into the regeneration module; and
   a second connector connecting the regenerated liquid desiccant outlet of the regeneration module to the liquid desiccant inlet of the dehumidifying module so that regenerated liquid desiccant may flow from the regeneration module into the dehumidifying module.

2. The system according to claim 1 wherein the liquid provided to the media material comprises a solution having a salt concentration between 70 and 90 weight percentage lithium chloride and between 30 and 10 weight percentage calcium chloride.

3. The system according to claim 1 wherein the membrane distillation module further comprises:
   a second condensation sheet having a distillate side and a feed side, the feed side being adapted to be in fluid communication with the diluted liquid desiccant,
   a second distillation membrane having a distillate side and a distilland side, wherein the distillate side of the second distillation membrane faces the distillate side of the second condensation sheet, the distilland side being adapted to receive and to be in fluid communication with the heated diluted liquid desiccant, and wherein the distilland side of the second distillation membrane faces the distilland side of the first distillation membrane,
   a second condensation chamber formed between the distillate side of the second distillation membrane and the distillate side of the second condensation sheet, the second condensation chamber having an upper section provided with a second extraction outlet, and a lower section provided with a second collection outlet, the first extraction and collection outlets being connected to the vacuum generator.

4. The system according to claim 1 wherein the distilland side of the first distillation membrane comprises a hydrophobic electrospun nanofiber layer, and the distillate side comprises a hydrophilic backing layer.

5. The system according to claim 1 wherein the media material comprises nanofiber coated nylon substrates.

6. The system according to claim 1 wherein the media material is arranged to have a plurality of folds and at least one gap between adjacent folds, the media material being arranged in the chamber such that the airflow path flows in a direction parallel to the folds of the media material.

7. The system according to claim 1 further comprising:
   a controller provided at the first connector for stopping diluted liquid desiccant from flowing from the dehumidifying module into the regeneration module, the controller being controlled by a humidity sensor provided at the gas outlet.

8. The system according to claim 7 further comprising:
a third connector connecting the controller to the liquid desiccant inlet of the dehumidifying module so that diluted liquid desiccant may flow from the controller into the dehumidifying module when the diluted liquid desiccant is stopped from flowing into the regeneration module.

9. The system according to claim 7 further comprising:
a membrane rejuvenation module including:
  a deionized water module configured to provide deionized water to the diluted liquid desiccant inlet of the regeneration module and to receive the deionized water from the regenerated liquid desiccant outlet of the regeneration module when the first controller stops the flow of diluted liquid desiccant from the dehumidifying module and when the second controller stops the flow of regenerated liquid desiccant into the dehumidifying module; and
  an acidic water module configured to provide acidic water to the diluted liquid desiccant inlet of the regeneration module and to receive the acidic water from the regenerated liquid desiccant outlet of the regeneration module when the flow of diluted liquid desiccant from the dehumidifying module is stopped, when the flow of regenerated liquid desiccant into the dehumidifying module is stopped and when the flow of deionized water from the deionized water module to the regeneration module is stopped.

10. The system according to claim 1 further comprising:
a cooler provided between the regenerated liquid desiccant outlet and the liquid desiccant inlet, the cooler configured to cool the regenerated liquid desiccant from the regeneration module before the cooled regenerated liquid desiccant is directed into the dehumidifier module.

11. A method for dehumidifying gas in a chamber, the chamber having a gas inlet and a gas outlet, the method comprising:
  generating an airflow path between the gas inlet and the gas outlet, the gas inlet being configured to receive humid gas and the gas outlet being configured to extract dehumidified gas;
  contacting a media material that has been sprayed with a liquid desiccant with gas in the airflow path to dehumidify the gas;
  collecting diluted liquid desiccant from the media material and providing the diluted liquid desiccant to a regeneration module having a first distillation membrane with a distillate side and a distilland side, and a first condensation sheet with a distillate side and a feed side, the first condensation sheet being located at a specified distance from the first distillation membrane in which the distillate side of the first distillation membrane faces the distillate side of the condensation sheet forming a first condensation chamber, the first condensation chamber having a first collection outlet and a first extraction outlet;
  applying negative pressure to the first condensation chamber through the first collection outlet and the first extraction outlet through a vacuum generator to extract non condensable gases formed within the first condensation chamber;
  flowing the diluted liquid desiccant along the feed side of the first condensation sheet;
  heating, using a heat exchanger, the diluted liquid desiccant after the diluted liquid desiccant has contacted the feed side of the first condensation sheet and directing the heated diluted liquid desiccant to the distilland side of the first distillation membrane;
  flowing the heated diluted liquid desiccant along the distilland side of the first distillation membrane;
  regenerating the liquid desiccant by extracting water vapor from the heated diluted liquid desiccant and condensing the water vapor from the heated liquid desiccant on the distillate side of the first condensation sheet;
  providing the regenerated liquid desiccant from the regeneration module to the chamber, whereby the regenerated liquid desiccant is sprayed over the media material in the chamber.

12. The method according to claim 11 wherein the liquid desiccant sprayed to the media material comprises a solution having a salt concentration between 70 and 90 weight percentage lithium chloride and between 30 and 10 weight percentage calcium chloride.

13. The method according to claim 11 wherein the media material comprises nanofiber coated nylon substrates.

14. The method according to claim 11 wherein the media material is arranged to have a plurality of folds and at least one gap between adjacent folds, the media material being arranged in the chamber such that the airflow path flows in a direction parallel to the folds of the media material.

* * * * *